United States Patent [19]
Brown et al.

[11] Patent Number: 5,852,085
[45] Date of Patent: Dec. 22, 1998

[54] TRANSPARENT BLENDS OF POLYETHERIMIDE RESINS

[75] Inventors: Sterling Bruce Brown, Niskayuna, N.Y.; Stephen Michael Copper, Newburgh, Ind.; Brenda A. Giles, Mt. Vernon, Ind.

[73] Assignee: General Electric Company, Pittsfield, Mass.

[21] Appl. No.: 775,697

[22] Filed: Dec. 31, 1996

[51] Int. Cl.⁶ .......................... C08K 5/5313; C08L 77/06; C08L 69/00; C08L 67/03
[52] U.S. Cl. .......................... 524/128; 524/133; 524/135; 524/147; 524/151; 524/152; 525/425; 525/433
[58] Field of Search ...................... 525/425, 433; 524/128, 133, 135, 147, 151, 152

[56] References Cited

U.S. PATENT DOCUMENTS

| | | | |
|---|---|---|---|
| 4,250,279 | 2/1981 | Robeson | 525/433 |
| 4,324,882 | 4/1982 | Takekoshi | 528/206 |
| 4,430,484 | 2/1984 | Quinn | 525/425 |
| 4,548,997 | 10/1985 | Mellinger et al. | 525/433 |
| 4,879,354 | 11/1989 | Harris | 525/433 |
| 4,908,419 | 3/1990 | Holub et al. | 525/425 |
| 5,055,531 | 10/1991 | Fox | 525/439 |
| 5,077,351 | 12/1991 | Matzner | 525/433 |
| 5,248,732 | 9/1993 | Drzewinski | 525/133 |
| 5,387,639 | 2/1995 | Sybert et al. | 525/433 |
| 5,521,258 | 5/1996 | Copper et al. | 525/425 |

FOREIGN PATENT DOCUMENTS

| | | | |
|---|---|---|---|
| 186927 | 7/1986 | European Pat. Off. | 525/433 |
| 325719 | 8/1989 | European Pat. Off. | |
| 0 711 810 A1 | 5/1996 | European Pat. Off. | |
| 081824 | 3/1989 | Japan. | |

*Primary Examiner*—David Buttner

[57] ABSTRACT

Disclosed are transparent blends of a polyetherimide, at least one resin selected from the group consisting of polycarbonate resins, poly(ester-carbonate) resins, and polyarylate resins, and an effective amount of a catalyst to provide transparency to the blends. In addition to being transparent, the blends have good ductility as well as high flexural and tensile properties. The yellowness index of the compositions can be improved with the addition of a phosphite.

24 Claims, No Drawings

TRANSPARENT BLENDS OF POLYETHERIMIDE RESINS

BACKGROUND OF THE INVENTION

1. Field of the Invention

The invention relates to thermoplastic molding compositions and more particularly to transparent compositions which are blends of polyetherimide resins and at least one other resin selected from the group consisting of poly(ester-carbonate) resins, polycarbonate resins and polyarylate resins. The invention further relates to transparent blends which have reduced color as indicated by lower ΔYI values. Articles molded from the transparent compositions are another embodiment of the present invention.

2. Brief Description of the Related Art

Poly(ester-carbonate) resins have been useful as ingredients in the preparation of blends of thermoplastic molding resins. These blends can be attractive to mold particular articles having certain desirable physical properties. For example, U.S. Pat. No. 4,430,484 describes blends of poly(ester-carbonate) resins with aromatic polyamides, polyimides, polyamideimides and polyetherimides wherein the blends show improved properties, such as higher heat distortion temperature under load. However, articles molded from these blends are opaque in nature and as such are precluded from applications requiring transparency.

Blends of polycarbonate resins and polyetherimide are per se known in the art as illustrated by U.S. Pat. No. 4,548,997 and are also opaque. These blends are described as improving the heat resistance of the polycarbonate resin while improving the ductility of the polyetherimide resin.

Polyarylates have also been blended with polyetherimides to obtain opaque compositions which have been described as having improved properties as found in U.S. Pat. No. 4,908,419.

In copending and commonly owned U.S. patent application Ser. No. 07/940,251, filed Sep. 1, 1992, now abandoned, ternary blends of polyetherimides, siloxane polyetherimide copolymers and polycarbonate resins including poly(ester-carbonate) resins are described broadly as thermoplastically moldable to obtain ductile articles with improved flame retardancy and strength properties useful in engineering thermoplastics.

In copending and commonly owned U.S. patent application Ser. No. 07/965,484, filed Oct. 23, 1992, now abandoned, blends of polyetherimides and siloxane polyetherimide copolymers and polycarbonate resins including poly(ester-carbonate) resins are described broadly as a method for improving the stress crack resistance of articles.

In commonly owned U.S. Pat. No. 5,387,639, ternary blends of polyetherimides, thermoplastic aromatic polyarylate resins and polycarbonate resins including poly(ester-carbonate) resins are described broadly as thermoplastically moldable to obtain ductile articles.

In commonly owned U.S. Pat. No. 5,521,258, blends of polyetherimides derived from metaphenylene diamine and poly(ester-carbonate) resins were found to meet the long felt needs for ductile, autoclave resistant articles.

Many of these same blends would be useful for the manufacture of articles, such as transparent medical stopcocks, except for the blends lack of transparency required for these same applications. Polycarbonate resins and poly(ester carbonate) resins, although having the necessary transparency, do not have sufficient heat resistance for the sterilization techniques for the medical applications. Polyetherimides on the other hand are too costly for these medical stopcocks applications. Thus, there is a long felt need for the development of alternative blend compositions that are transparent and able to withstand repeated heat exposure.

SUMMARY OF THE INVENTION

The present invention provides thermoplastic compositions which meet the long felt needs for transparent articles which comprise transparent compositions of:

(a) a polyetherimide resin;

(b) at least one resin selected from the group consisting of polycarbonate resins, poly(ester-carbonate) resins, and polyarylate resins; and (c) an effective amount of a catalyst to provide transparency to the compositions.

In a first preferred embodiment of the present invention, the polyetherimide resin comprises repeat units of the formula (I):

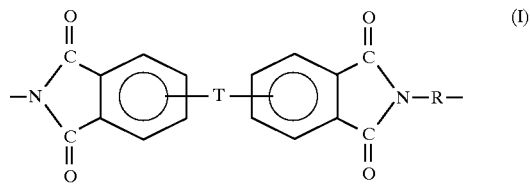

wherein T is —O— or a group of the formula —O—Z—O— wherein the divalent bonds of the —O— or the —O—Z— group are in the 3,3', 3,4', 4,3', or the 4,4' positions; Z is a divalent radical selected from the group consisting of formulae (II):

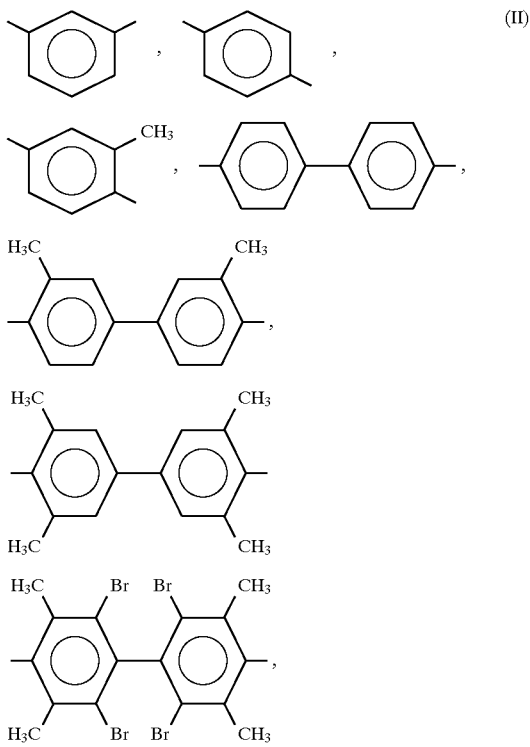

-continued

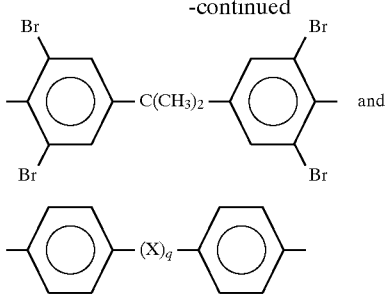

and

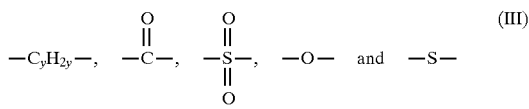

wherein X is a member selected from the group consisting of divalent radicals of the formulae (III):

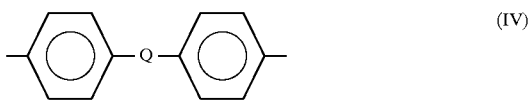

(III)

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the formula (IV):

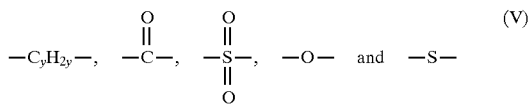

(IV)

where Q is a member selected from the group consisting of formulae (V):

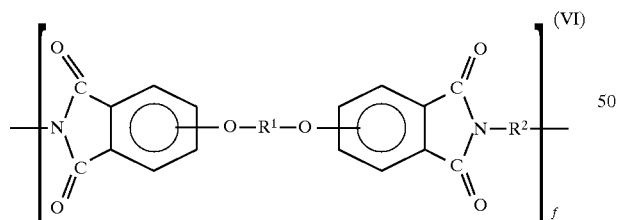

(V)

where y is an integer from about 1 to about 5.

In a second preferred embodiment of the present invention, the polyetherimide resin comprises repeating chain units of the formula (VI):

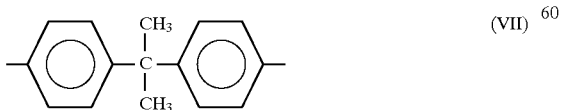

(VI)

wherein f is an integer of from about 10 to about 500; $R^2$ is para-phenylene, meta-phenylene, or mixtures of para-phenylene and meta-phenylene and $R^1$ is the divalent moiety of formula (VII):

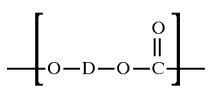

(VII)

In a third preferred embodiment of the present invention, the poly(ester-carbonate) resin comprises repeating polycarbonate chain units of the formula (VIII):

(VIII)

and recurring carboxylic chain units of the formula (IX):

—O—R—O—D—  (IX)

wherein each D is independently a divalent aromatic radical of a dihydric phenol employed in the resin preparation and R is a divalent moiety selected from those of the formulae (X) or (XI), or mixtures thereof:

(X)

or

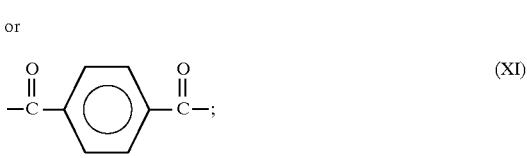

(XI)

wherein the poly(ester carbonate) resin has a weight average molecular weight of between about 25,000 and about 40,000 relative to polystyrene standards as determined by gel permeation chromatography.

In a fourth preferred embodiment of the present invention, the polycarbonate resin comprises repeating carbonate chain units of the above mentioned formula (VIII):

(VIII)

wherein in this embodiment D is a divalent aromatic radical of a dihydric phenol employed in the resin preparation.

In a fifth preferred embodiment of the present invention, the polyarylate resin has recurring carboxylic chain units of the formula (XII):

—O—R—O—D—  (XII)

wherein D is a divalent aromatic radical of a dihydric phenol employed in the resin preparation and R is a divalent moiety selected from those of the formulae (XIII) or (XIV), or mixtures thereof:

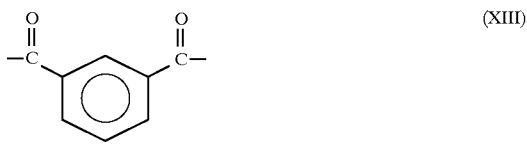

(XIII)

or

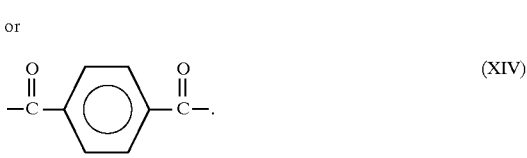

(XIV)

In a sixth preferred embodiment of the present invention, the thermoplastic compositions comprise at least one reaction product of:

(a) a polyetherimide resin and (b) at least one resin selected from the group consisting of polycarbonate resins, poly(ester-carbonate) resins, and polyarylate resins.

In a seventh preferred embodiment of the present invention, the catalyst is preferably a metal organophosphinate, and most preferably sodium phenylphosphinate.

In an eighth preferred embodiment of the present invention, the thermoplastic molding compositions further comprise a catalyst quencher which preferably comprises at least one organic phosphite.

DETAILED DESCRIPTION OF THE PREFERRED EMBODIMENTS OF THE INVENTION

The polyetherimide resins (referred to hereinafter as PED comprising ingredient (a) in the blends of the present invention are known compounds whose preparation and properties are described in U.S. Pat. Nos. 3,803,085 and 3,905,942, both of which are incorporated herein by reference.

The PEI used for preparing the blends of this invention contain repeat units in excess of 1 and typically from 10 to 1000 or more of the formula (I):

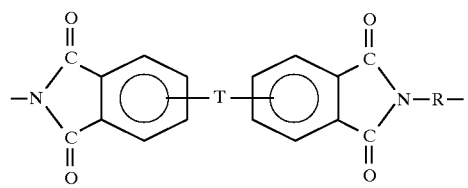

wherein T is —O— or a group of the formula —O—Z—O— wherein the divalent bonds of the —O— or the —O—Z—O— group are in the 3,3', 3,4', 4,3', or the 4,4' positions; Z is a divalent radical selected from the group consisting of formulae (II):

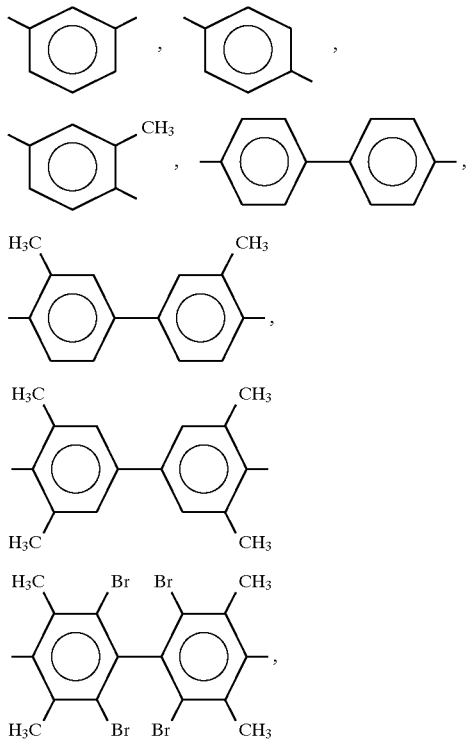

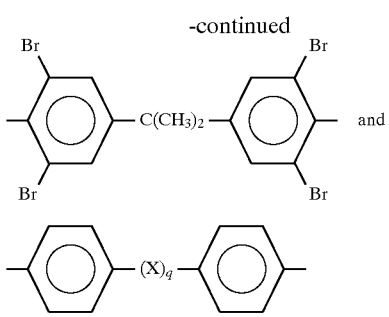

wherein X is a member selected from the group consisting of divalent radicals of the formulae (III):

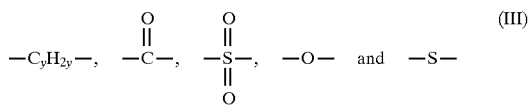

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

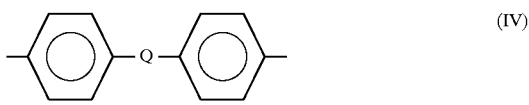

where Q is a member selected from the group consisting of formulae (V):

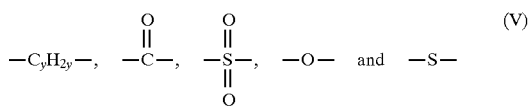

where y is an integer from about 1 to about 5.

In one embodiment, the PEI may be a copolymer which, in addition to the etherimide units described above, further contains polyimide repeating units of the formula (XV):

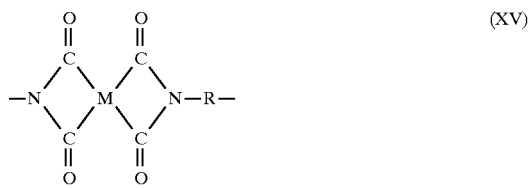

wherein R is as previously defined for formula (I) and M is selected from the group consisting of formula (XVI):

formula (XVII):

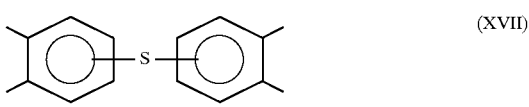

and formula (XVIII):

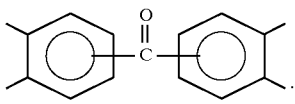
(XVIII)

The PEI can be prepared by any of the methods well known to those skilled in the art, including the reaction of an aromatic bis(ether anhydride) of the formula (XIX):

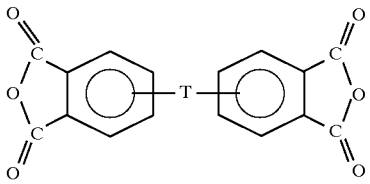
(XIX)

with an organic diamine of the formula (XX):

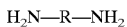
(XX)

wherein T and R are defined as described above in formula (I). In general the reactions can be carried out employing well-known solvents, e.g., o-dichlorobenzene, m-cresol/toluene and the like to effect interaction between the anhydride of formula (XIX) and the diamine of formula (XX), at temperatures from about 100° C. to about 250° C. Alternatively, the PEI can be prepared by melt polymerization of aromatic bis(ether anhydride)s and diamines accomplished by heating a mixture of the ingredients at elevated temperatures with concurrent stirring. Generally melt polymerizations employ temperatures between about 200° C. and 400° C. Chain stoppers and branching agents may also be employed in the reaction. The PEI and their preparation are described in U.S. Pat. No. 3,983,093 (Williams, et al.), which is incorporated herein by reference.

Examples of specific aromatic bis(ether anhydrides) and organic diamines are disclosed, for example, in U.S. Pat. Nos. 3,972,902 and 4,455,410, which are incorporated by reference herein.

Illustrative examples of aromatic bis(ether anhydride)s of formula (XIX) include:
2,2-bis(4-(3,4-dicarboxyphenoxy)phenyl)propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride;
2,2-bis([4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride;
4-(2,3-dicarboxyphenoxy)-4'-3,4-dicarboxyphenoxy)diphenyl-2,2-propane dianhydride;
4-(2,3-dicarboxyphenoxy)-4'-(3,4-dicarboxyphenoxy)diphenyl ether dianhydride;
4-(2,3-dicarboxyphenoxy)-4'-(3,4-dicarboxyphenoxy)diphenyl sulfide dianhydride;
4-(2,3-dicarboxyphenoxy)-4'-(3,4-dicarboxyphenoxy)benzophenone dianhydride;
4-(2,3-dicarboxyphenoxy)-4'-(3,4-dicarboxyphenoxy)diphenyl sulfone dianhydride, and various mixtures thereof.

A preferred class of aromatic bis(ether anhydride)s included by formula (XIX) above includes compounds wherein T is of the formula (XXI):

(XXI)

and the ether linkages are in the 3,3', 3,4', 4,3', or the 4,4' positions, and mixtures thereof, and where Y is selected from the group consisting of: formulae (XXII):

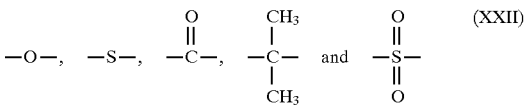
(XXII)

When PEI/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

The organic diamines of formula (XX) include, for example:
m-phenylenediamine;
p-phenylenediamine;
4,4'-diaminodiphenylpropane,
4,4'-diaminodiphenylmethane (commonly named 4,4'-methylenedianiline);
4,4'-diaminodiphenyl sulfide;
4,4'-diaminodiphenyl sulfone;
4,4'-diaminodiphenyl ether (commonly named 4,4'-oxydianiline);
1,5-diaminonaphthalene;
3,3-dimethylbenzidine;
3,3-dimethoxybenzidine;
2,4-bis(beta-amino-t-butyl)toluene;
bis(p-beta-amino-t-butylphenyl)ether;
bis(p-beta-methyl-o-aminophenyl)benzene;
1,3-diamino-4-isopropylbenzene;
1,2-bis(3-aminopropoxy)ethane;
benzidine;
m-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
1,18-octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1-4-cyclohexanediamine;
1,18-octadecanediamine;
bis(3-aminopropyl)sulfide;
N-methyl-bis(3-aminopropyl)amine;
hexamethylenediamine;
heptamethylenediamine;

nonamethylenediamine;
decamethylenediamine; and
mixtures of such diamines.

Generally, useful PEI have an intrinsic viscosity [η] greater than about 0.2 deciliters per gram, preferably of from about 0.35 to about 0.7 deciliters per gram measured in m-cresol at 25° C.

Included among the many methods of making the PEI are those disclosed in U.S. Pat. Nos. 3,847,867, 3,814,869, 3,850,885, 3,852,242 and 3,855,178. These disclosures are incorporated herein in their entirety by reference for the purpose of teaching, by way of illustration, general and specific methods for preparing PEI for use in the blends of this invention.

Illustrative of a particularly preferred PEI falling within the scope of Formula (I) is one comprising repeating units wherein R is paraphenylene, metaphenylene, or mixtures of paraphenylene and metaphenylene and T is a group of the formula —O—Z—O— wherein Z has the formula (XXIII):

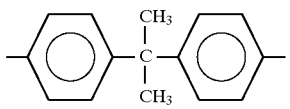
(XXIII)

and wherein the divalent bond of the —O—Z—O— group is in the 3,3' positions.

The other resin component in the invention is at least one resin selected from the group consisting of poly(ester-carbonate) resins, polycarbonate resins, and polyarylate resins.

The poly(ester-carbonate) resins (referred to hereinafter as "PEC") used in ingredient (b) comprise repeating polycarbonate chain units of the formula (VIII):

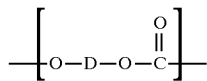
(VIII)

and recurring carboxylic chain units of the formula (IX):

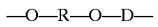
(IX)

wherein each D is independently a divalent aromatic radical of a dihydric phenol employed in the resin preparation and R is a divalent moiety selected from those of the formulae (X) or (XI), or mixtures thereof:

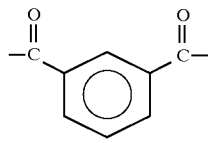
(X)

or

(XI)

The PEC may be prepared by either melt polymerization or by interfacial polymerization. Melt polymerization involves co-reacting, for example, diphenyl carbonate with various mixtures of dihydric phenols and ester precursors such as, for example, diphenyl derivatives of iso- and terephthalates, and their mixtures. Various catalysts or mixtures of catalysts such as, for example, lithium hydroxide and lithium stearate can also be used to accelerate the polymerization reactions.

In general, the method of interfacial polymerization comprises the reaction of a dihydric phenol with a carbonate precursor in the presence of an ester precursor. Examples of interfacial polymerization techniques can be found in U.S. Pat. Nos. 3,169,121 and 4,487,896 which are incorporated herein by reference.

Although the reaction conditions of the preparative processes may vary, several of the preferred processes typically involve dissolving or dispersing dihydric phenol and ester precursor reactants in aqueous caustic, combining the resulting mixture with a suitable water immiscible solvent medium and contacting the reactants with the carbonate precursor, such as, for example, phosgene, in the presence of a suitable catalyst and under controlled pH conditions. The most commonly used water immiscible solvents include methylene chloride, 1,2-dichloroethane, chlorobenzene, toluene, and the like.

Advantageously a catalyst may be added to the reaction mixture to promote the reaction. The catalyst typically accelerates the rate of polymerization of the dihydric phenol and ester precursor reactants with the carbonate precursors. Representative catalysts include but are not limited to, for example, tertiary amines such as triethylamine, quaternary phosphonium compounds, quaternary ammonium compounds, and the like.

The preferred process for preparing PEC comprises a phosgenation reaction. The temperature at which the phosgenation reaction proceeds may vary from below about 0° C. to about 100° C. The phosgenation reaction preferably proceeds at temperatures of from about room temperature (about 23° C.) to about 50° C. Since the reaction is exothermic, the rate of phosgene addition may be used to control the reaction temperature. The amount of phosgene required will generally depend upon the amount of the dihydric phenol reactants added.

The dihydric phenols employed are known, and the reactive groups are thought to be the phenolic hydroxyl groups. Some of the dihydric phenols are represented by the general formula (XXIV):

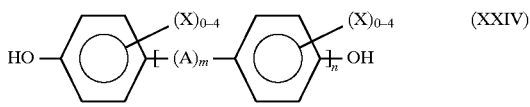
(XXIV)

wherein A is a divalent hydrocarbon radical containing from 1 to about 15 carbon atoms or a substituted divalent hydrocarbon radical containing from 1 to about 15 carbon atoms and substituent groups such as halogen; —S—; —SS—; —S(O)$_2$—; —O—; or —S(O)—; each X is independently selected form the group consisting of hydrogen, halogen, and a monovalent hydrocarbon radical such as an alkyl group of from 1 to about 8 carbon atoms, an aryl group of from 6 to about 18 carbon atoms, an aralkyl group of from 7 to about 14 carbon atoms, and alkaryl group of from 7 to about 14 carbon atoms, and alkoxy group of from 1 to about 8 carbon atoms; and m is 0 or 1 and n is an integer of from 0 to about 5.

Typical of some of the dihydric phenols employed are bis-phenols such as (4-hydroxy-phenyl)methane, 2,2-bis(4-hydroxyphenyl)propane (also known as bisphenol-A), 2,2-bis(4-hydroxy-3,5-dibromo-phenyl)propane; dihydric phenol ethers such as bis(4-hydroxyphenyl)ether, bis(3,5-dichloro-4-hydroxyphenyl)ether; dihydroxydiphenyls such as p,p'-dihydroxydiphenyl, 3,3'-dichloro-4,4'-dihydroxydiphenyl; dihydroxyaryl sulfones such as bis(4-hydroxyphenyl)sulfone, bis(3,5-dimethyl-4-hydroxyphenyl) sulfone, dihydroxy benzenes such as resorcinol, hydroquinone, halo- and alkyl-substituted dihydroxybenzenes such as 1,4-dihydroxy-2,5-dichlorobenzene, 1,4- dihydroxy-3-methylbenzene; and dihydroxydiphenyl sulfides and sulfoxides such as bis(4-hydroxyphenyl)sulfide, bis(4-hydroxy-phenyl)sufoxide and bis(3,5-dibromo-4-hydroxy-phenyl)sulfoxide. A variety of additional dihydric phenols are available and are disclosed in U.S. Pat. Nos. 2,999,835, 3,028,365 and 3,153,008; all of which are incorporated herein by reference. It is, of course, possible to employ two or more different dihydric phenols or a combination of a dihydric phenol with a glycol.

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydric phenols such as bischloroformates of 2,2-bis(4-hydroxy-3,5-dichlorophenyl)-propane, hydroquinone, and the like, or bishaloformates of glycol, and the like. While all of the above carbonate precursors are useful, carbonyl chloride, also known as phosgene, is preferred.

In general, any dicarboxylic acid conventionally used in the preparation of polyesters may be utilized in the preparation of poly(ester-carbonate) resins. However, the PEC used in the present invention are prepared with aromatic dicarboxylic acids, and in particular terephthalic acid, and mixtures thereof with isophthalic acid wherein the weight ratio of terephthalic acid to isophthalic acid is in the range of from about 2:98 to about 98:2, especially preferred are weight ratios of terephthalic acid to isophthalic acid in the range of from about 40:60 to about 60:40.

Rather that utilizing the dicarboxylic acid per se, it is possible, and sometimes even preferred, to employ various derivatives of the acid moiety. Illustrative of these reactive derivatives are the acid halides. The preferred acid halides are the acid dichlorides and the acid dibromides. Thus, for example instead of using terephthalic acid or mixtures thereof with isophthalic acid, it is possible to employ terephthaloyl dichloride, and mixtures thereof with isophthaloyl dichloride In the conventional interfacial polymerization methods of preparing PEC, polycarbonates and polyarylates, a molecular weight regulator (a chain stopper) is generally added to the reaction mixture prior to or during the polymerization reactions with carbonate and/or ester precursors. Useful molecular weight regulators include, for example, monohydric phenols such as phenol, chroman-I, para-t-butylphenol, p-cumylphenol and the like.

The proportions of reactants employed to prepare the PEC will vary in accordance with the proposed use of the blends of the invention containing this product resin. In general, the amount of the combined ester units of terephthalate and isophthalate may be from about 20% by weight to about 85% by weight, relative to the carbonate units, preferably about 40% to about 80% by weight relative to the carbonate units.

The preferred PEC for use as the ingredient (b) in the blends of the present invention are those derived from reaction of bisphenol-A and phosgene with iso- and terephthaloyl chloride and having a weight average molecular weight of between about 25,000 and about 40,000 relative to polystyrene standards as determined by gel permeation chromatography. For enhancing the lipid resistance of the present compositions, an especially preferred PEC has a weight average molecular weight of at least about 30,000 and preferably at least about 34,000 (relative to polystyrene standards as determined by gel permeation chromatography).

Additional embodiments of the invention include thermoplastic molding compositions containing polycarbonate resins. Polycarbonate resins (hereinafter referred to as "PC") include polymers containing a substantial proportion of aromatic polycarbonate units. Substantial proportion generally means greater than about 20 percent by weight of polycarbonate units in the polymer. The polycarbonate materials comprise structural units of the formula (VIII),

wherein D is a divalent organic radical.

Suitable D values in formula (VIII) include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all D radicals are hydrocarbon radicals although mixtures of various radicals may also be useful.

Preferably, at least about 60% and more preferably at least about 80% of the total number of D values, and most desirably all of said D values, are aromatic. The aromatic D radicals preferable have the formula (XXV):

wherein each of $A^1$ and $A^2$ is a monocyclic divalent aromatic radical and Y is a bridging radical in which one or two atoms separate $A^1$ from $A^2$. The free valence bonds in formula (XXV) are usually in the meta or para positions of $A^1$ and $A^2$ in relation to Y.

In formula (XXV), the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o-phenylene or m-phenylene, or one o-phenylene or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula (XXV) is the 2,2-bis(4-phenylene) propane radical, which is derived from bisphenol A and in which Y is isopropylidene and $A^1$ and $A^2$ are each p-phenylene.

PC and their method of preparation by interfacial polymerization are provided in U.S. Pat. Nos. 3,028,365, 3,334,154, 3,275,601, 3,915,926, 3,303,331, 3,169,121, 3,027,814 and 4,188,314, all of which are incorporated herein by reference. In general, the method is as described above for preparing PEC, but in the absence of an ester precursor.

The weight average molecular weight of the PC should be at least about 30,000 (as determined by gel permeation chromatography relative to polystyrene). It is most often in the range of about 35,000 to about 40,000. However, compositions in which the PC has a higher molecular weight often have favorable ductility at the expense of decreased flow. The exact molecular weight utilized will depend, in part, on the end-use requirements of the desired application and the degree of molding difficulty encountered in forming the part.

The polyarylate resins (hereinafter referred to as "PAR") are also useful in the present invention. PAR are well known resins having recurring carboxylic chain units of the formula (XII):

  (XII)

wherein D is a divalent aromatic radical of a dihydric phenol employed in the resin preparation and R is a divalent moiety selected from those of the formulae (XIII) or (XIV), or mixtures thereof:

 (XIII)

or

 (XIV)

PAR in general are prepared by reacting an aromatic difunctional carboxylic acid or ester forming derivative thereof, and a dihydric phenol. The PAR may be polymerized from a carboxylic acid/hydroxy functional monomer in a head-tail arrangement. The aromatic dicarboxylic acids and dihydric phenols described above for preparation of polyester-carbonates may be used in the preparation of polyarylate resins.

In a preferred PAR, the difunctional carboxylic acid residue portion contains residues of terephthalic acid or mixtures of terephthalic acid and isophthalic acid. More preferably, such polyarylates contain residues of a mixture of from about 30 to about 70 mole percent terephthalic acid and from about 70 to about 30 mole percent of isophthalic acid. A PAR containing residues of a mixture of 50 mole percent of terephthalic acid and 50 mole percent isophthalic acid is common. In general, these and other suitable polyarylates have a reduced viscosity of from about 0.4 to about 1.0 dl/g as measured in p-chlorophenol at 49° C. PAR employed in the present invention can be prepared by any of the well known prior art polyester forming reactions, such as the reaction of the acid chlorides of the aromatic dicarboxylic acids with the dihydric phenol, the reaction of the diaryl esters of the aromatic dicarboxylic acids with the dihydric phenol, and the reaction of the aromatic diacids with diester derivatives of dihydric phenol. These processes are described in, for example, U.S. Pat. Nos. 3,317,464; 3,948, 856; 3,780,148; 3,824,213; 3,133,898; and 4,477,647; all of which are incorporated wherein by reference thereto.

Also included within the blends of the present invention is the presence of randomly branched PEC, randomly branched PC, and randomly branched PAR. These randomly branched materials are sometimes useful for altering the rheological characteristics of the blends containing the linear polymers for fabrication techniques such as pressure forming or blow molding and can be used as partial or full replacements for the linear materials. The randomly branched polymers are prepared by co-reacting a polyfunctional organic compound with the afore-described dihydric phenols, carbonate and/or ester precursors. The polyfunctional organic compounds useful in making the branched polycarbonates are set forth in U.S. Pat. Nos. 3,544,514, 3,635,895 and 4,001,184 which are incorporated herein by reference. The polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl)ethane, 1,3,5,-trihydroxy-benzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic dianhydride, and the like. The preferred polyfunctional aromatic compounds are 1,1,1-tri(4-hydroxyphenyl)ethane, trimellitic anhydride or trimellitic acid or their haloformyl derivatives.

A third essential ingredient of the present invention is an effective amount of a catalyst to result in a composition which is transparent. The catalyst is thought to effect reactions between the PEI and the other resin components (i.e., PEC, PC, PAR). These reaction products between the PEI and the other resin components are believed to be block, graft and mixture of block and graft copolymers as well as random or scrambled copolymers between the various resins components. It is possible that a variety of copolymer architectures are made in the present compositions. The presence of the copolymers is believed to be indicated by a new glass transition temperature (Tg) which is in between the normal Tg's observed for PEI and the Tg's of the other resin components. To observe the copolymer between the PEI and the other resin component, analysis by Dynamic Mechanical Analysis (DMA) can be readily performed to observe the transitions of the resins. Illustrative data analyzing for glass transition temperatures is as follows:

| PEI | 25 | 25 | 50 |
|---|---|---|---|
| PEC | 75 | 75 | 50 |
| catalyst | 0 | 0.03 | 0.03 |
| Tg (°C.) | 177.7, 212 | 185.4 | 195 |

As seen by these data, a reaction product between the PEI and the PEC is formed resulting in the formation of a new glass transition temperature in between the original glass transition temperature for each of the individual resin components. The Tg of the PEI is at about 212° C. and the Tg of the PEC is at about 178° C. It is further believed that some amount of unreacted or non-copolymer containing resins may also be present By unreacted or non-copolymer containing resins is meant the PEI and/or the PEC, PC, and PAR used in preparing the compositions. It should be clear that reaction products between the PEI and the PEC, PC, and/or PAR are included in the present invention.

Useful catalysts for the present invention include those catalysts which are known in the art for polyester polymerization reactions. Included catalysts are metal organophosphinate, an alkaline earth metal oxide, an organic titanate, or a mixture of any of the foregoing. An especially preferred catalyst is sodium phenyl phosphinate (herein after referred to as "SPP") as shown in formula (XXVI):

Useful catalysts also include those which may thermally degrade during the course of processing PEI with PEC, PC, and/or PAR. Such catalysts include quaternary ammonium salts and quaternary phosphonium salts. In these salts the anionic counter-ion may be chosen from those well-known in the art such as, for example, halide, hydroxide, phenolate, thiophenolate, carboxylate, sulfonate, sulfate, hydrogen sulfate, phosphate, hydrogen phosphate, dihydrogen phosphate, phosphite, phosphinate, phosphonate, tetrafluoroborate, tetraphenylborate, and the like. A preferred catalyst is the bis-phenolate salt hexaethylguanidinium bis(bisphenol-A).

The amount of the catalyst used can vary somewhat according to the ratios of PEC and PEI used, the reaction conditions and the degree of reaction desired between the PEC and PEI. Generally, an effective amount is the level of catalyst which results in a transparent composition which is splay-free. Splay is a surface imperfection in molded parts that is thought to be generated by off-gasses from the molten composition. The off-gasses are thought to be the result of by-products of reactions between the components of the composition and/or from degradation of the polymers. The effective amount is between about 0.0005 weight percent and about 1 weight percent based on the total weight of the composition. A preferred range is between about 0.005 weight percent to about 0.1 weight percent, and an especially preferred range is between about 0.01 weight percent and about 0.05 weight percent; all based on the total weight of the composition. In general, use of the minimum amount of catalyst necessary to achieve transparency is desired as excessive levels of catalyst often lead to diminished physical properties.

It is often preferable to add a catalyst quenching agent to the PEI/PEC compositions after the desired chemical reactions have been completed to the desired degree. By the term catalyst quenching agent is meant species which render the catalyst inactive to accelerate addition chemical reactions between the PEI and PEC. Useful catalyst quenching agents include, for example, phosphites and diphosphites, phosphinic acids and phosphonic acids, phosphorous acid, dihydrogen phosphates such as sodium dihydrogen phosphate, metaphosphoric acids, and organic acids and anhydrides. Specific examples of various catalyst quenchers can be found in U.S. Pat. No. 5,055,531, the disclosure of which is hereby incorporated by reference.

Especially preferred catalyst quenchers are the organic phosphites having the formula: $R_jP(OR)_k$ wherein each R may independently be a hydrogen atom, an alkyl radical having from 1 to about 20 carbon atoms, or an aryl radical having from 6 to about 20 carbon atoms, with the proviso that at least one of the R radicals must be an alkyl or aryl radical; j is 1 or 0 and k is 3 if j is 0 and k is 2 if j is 1. Useful organic phosphites include, for example, diphenylphosphite, tris-nonylphenylphosphite, bis(2,4-di-t-butylphenyl) pentaerythritol diphosphite, and tris(2,4-di-tert-butylphenyl) phosphite. The level of phosphite added to the composition is that level which is effective to quench or inhibit the catalyst's activity. Generally, between about 0.01 weight percent to about 3 weight percent based upon the total weight of the composition is employed. A more preferred amount is usually between about 0.1 weight percent and 1.0 weight percent based upon the total weight of the composition. The exact amount used is somewhat dependent on the catalyst utilized and the efficiency of the particular catalyst quencher to inhibit the catalyst. When a thermally degradable catalyst is employed, the additional of a catalyst quencher is optional. Determination of a particular preferred range can be readily determined without undue experimentation.

The very low levels of catalyst and optional quenching agent present difficulties in accurately metering and dispersing the ingredients into the compositions. One method to overcome many of these difficulties is to disperse the additive into one of the resin components at a higher level to make a concentrate of the additive followed by adding the concentrate to the composition to achieve the desired level of additive. A wide weight ratio of additive levels is useful in the concentrates although typical useful ranges are between about 0.1% to about 5% by weight based on the weight of the resin used as the carrier.

The blend compositions of the present invention may be modified by the addition of other additives conventionally used in the art of plastics compounding albeit with the possibility of sacrificing the transparency of the composition to gain some other property advantage. Such additives can include fillers (such as, for example, clay, mica or talc), supplementary delustrants, reinforcing agents (such as, for example, glass fibers), impact modifiers (such as, for example, epoxy modified polyolefins), plasticizers, flow promoters and other processing aids, stabilizers, colorants, pigments, mold release agents, ultraviolet screening agents, drip inhibitors (such as, for example, polytetrafluoroethylene (PTFE)), supplementary or synergistic flame retardant, and the like.

The amount of the PEI used in the invention can vary widely depending on the ultimate properties desired in the final composition. When PEC and/or PAR are used with PEI, the PEI can range from about 5 weight percent to about 95 weight percent of the entire composition and conversely the PEC and/or PAR can vary from about 95 weight percent to about 5 weight percent based on the weight of the entire composition. The physical properties of the compositions will vary depending, at least in part, on the ratio of the resin components utilized in the composition. To explain this point further, compositions which are rich in PEI (i.e., have greater amount of PEI than PEC) will have greater heat resistance (indicated by higher heat distortion values) than compositions which are rich in PEC. Conversely, compositions which are rich in PEI will have greater sensitivity to notches and sharp radii (indicated by lower notched Izod impact values) than compositions which are rich in PEC (i.e., have greater amount of PEC than PEI). Determination of an exact ratio of PEI to the other resin component is therefore determined, in part, by the physical properties desired in the final composition.

In compositions wherein PC is the second resin component, the range over which transparent compositions can be satisfactorily obtained is much narrower: up to about 50 percent by weight PC based on the total weight of the composition. Compositions containing greater than about 50 percent by weight PC based on the total weight of the composition have reduced transparency although other useful and improved physical properties may be obtained at higher levels of PC. The amount of PC contained in the compositions is therefore generally between about 5 percent and 50 percent by weight and preferably, between about 5 percent and about 40 percent by weight, wherein all are based upon the total weight of the composition.

It should also be clear that transparent articles prepared from the compositions of the present invention represent an additional embodiment of this invention.

The preparation of the compositions of the present invention is normally achieved by merely blending the ingredients under conditions for the formation of an intimate blend. Such conditions often include solution blending or melt mixing in single or twin screw type extruders, mixing bowl, or similar mixing devices which can apply a shear to the components. Twin screw extruders are often preferred due to their more intensive mixing capability over single screw extruders. It is often advantageous to apply a vacuum to the melt through at least one vent port in the extruder to remove volatile impurities in the composition.

The compositions can be prepared by feeding the resin components along with the catalyst into the throat of an extruder followed by intimately mixing and melting the composition to allow for chemical reactions to occur. The catalyst quenching agent can be added to the composition in a variety of manners such as adding the quenching agent in a separate compounding processing step, adding the quenching agent into another port in the extruder, or adding the quenching agent during a step fabricating the composition into an article. It is often preferred to add the quenching agent into another port in the same compounding step in order to insure adequate mixing and to minimize the heat treatments the composition is subjected to. Methods may of course vary and include a combination of the aforementioned methods (i.e., adding quenching agents or additives both to the extruder and in the fabrication step). As previously mentioned, it is often advantageous to add the catalyst and/or the catalyst quencher in the form of concentrates.

The following examples are provided to illustrate some embodiments of the present invention. They are not intended to limit the invention in any aspect. All percentages are by weight based on the total weight of the entire composition, unless otherwise indicated.

EXAMPLES

The materials used in the following composition were:

PEI-1: a polyetherimide resin derived from metaphenylene diamine and commercially available under the trademark ULTEM as grade 1010 from GE Plastics.

PEI-2: a polyetherimide resin derived from metaphenylene diamine and commercially available under the trademark ULTEM as grade 1000 from GE Plastics. PEI-1 and PEI-2 differ in viscosity with PEI-1 having a lower viscosity that PEI-2.

PEI-3: a polyetherimide resin derived from paraphenylene diamine and commercially available under the trademark ULTEM as grade CRS5001 from GE Plastics.

PEC-1: a poly(ester carbonate) derived from bisphenol-A and having a weight average molecular weight between about 34,000 and about 36,000 (relative to polystyrene standards as determined by gel permeation chromatography). The PEC had about 60% combined ester units relative to carbonate units. The ester units were derived from about a 1:1 ratio of isophthalic acid to terephthalic acid. The PEC was obtained from GE Plastics.

PEC -2: a poly(ester carbonate) derived from bisphenol-A and having a weight average molecular weight between about 27,000 and about 29,700 (relative to polystyrene standards as determined by gel permeation chromatography). The PEC had about 60% combined ester units relative to carbonate units. The ester units were derived from about a 1:1 ratio of isophthalic acid to terephthalic acid. The PEC was obtained from GE Plastics.

PEC -3: a poly(ester carbonate) derived from bisphenol-A and having a weight average molecular weight between about 27,000 and about 29,500 (relative to polystyrene standards as determined by gel permeation chromatography). The PEC had about 80% combined ester units relative to carbonate units. The ester units were derived from about a 93:7 ratio of isophthalic acid to terephthalic acid. The PEC was obtained from GE Plastics.

PC-1: a polycarbonate derived from bisphenol-A and having a weight average molecular weight between about 35,500 and about 37,500 (relative to polystyrene standards as determined by gel permeation chromatography) and commercially available under the trademark LEXAN as grade 130 from GE Plastics.

PAR: a polyarylate resin comprising a bisphenol-A isophthalate-terephthalate polyarylate with an iso-to tere-molar ratio of about 1:1 and an intrinsic viscosity in a 60:40 weight ratio of phenol-tetrachloroethane of about 0.71 dl/g. The PAR was obtained from Union Carbide under the trademark ARDEL as grade D100.

SPP: sodium phenylphosphinate.

DPP: diphenylphosphite.

TNPP: tris-nonylphenylphosphite.

U-626: bis(2,4-di-t-butylphenyl)pentaerythritol diphosphite sold by General Electric Company under the trademark ULTRANOX as grade 626.

I-168: tris(2,4-di-tert-butylphenyl)phosphite obtained from Ciba-Geigy Corporation under the trademark IRGAFOS as grade 168.

In a series of runs, the blends were fed to an extruder at a temperature of about 320° C. to about 340° C. to intimately mix the components and extruded into strands. The phosphites, when utilized, were added into a second port in the extruder located near the exit port of the extruder. The strands were chopped into pellets and injection molded under standard conditions into test samples for physical property testing. The composition of each blend and the physical property data are set forth in the Tables below. Molded test specimens of the compositions were subjected to measurement of notched Izod impact strength according to ASTM D256 (employing a sample size of 2.5 inch by 0.5 inch by 0.125 inch), Dynatup (energy to fracture, falling dart test) strength according to ASTM D3763 (using 4 inch diameter by 0.125 inch disks), flexural modulus and flexural strength according to ASTM D790 (employing a sample size of 6 inch by 0.5 inch by 0.25 inch), and tensile yield and tensile elongation at break according to ASTM D638 using type I and/or type V test specimens. Yellowness Index and percent transmission were measured according to ASTM D1925.

TABLE 1

| Sample: | 1 | 2 | 3 | 4 | 5 |
|---|---|---|---|---|---|
| PEI-1 | 25 | 25 | 25 | 25 | 25 |
| PEC-1 | 75 | 75 | 75 | 75 | 75 |
| SPP | 0 | 0.01 | 0.02 | 0.03 | 0.05 |
| Properties: | | | | | |
| MI @ 295° C. | 0.81 | 0.54 | 1.14 | 1.9 | — |
| HDT @ 264 psi | 161 | 162 | 165 | 174 | — |
| Notched Izod, ft-lb/in | 3.2 | 4.8 | 2.4 | 2.3 | — |
| reversed Notched Izod, ft-lb/in | 38.8 | 39.5 | 39.9 | 36.8 | — |
| Dynatup, ft-lb | 36.9 | 43.1 | 43.1 | 41.9 | — |
| Tensile strength, Kpsi | 10.6 | 10.6 | 11 | 11 | — |
| Tensile elongation, % | 35 | 68 | 52 | 31 | — |
| Tensile modulus, Kpsi | 316 | 325 | 336 | 325 | — |
| Flexural strength, Kpsi | 16 | 15.4 | 15.7 | 15.8 | — |
| Flexural modulus, Kpsi | 388 | 367 | 370 | 376 | — |

TABLE 1-continued

| Sample: | 1 | 2 | 3 | 4 | 5 |
|---|---|---|---|---|---|
| Specific gravity | 1.22 | 1.22 | 1.22 | 1.22 | — |
| Transparent | no | yes | yes | yes | splay |

The data in Table 1 for a 3:1 ratio of PEC to PEI illustrate that at this ratio, splay-free compositions can be obtained which are transparent. For the 3:1 ratio of PEC to PEI effective levels of catalyst are less than 0.05 weight percent.

TABLE 2

| sample: | 6 | 7 | 8 | 9 | 10 | 11 |
|---|---|---|---|---|---|---|
| PEI-1 | 100 | 15 | 25 | 50 | 75 | 0 |
| PEC-1 | 0 | 85 | 75 | 50 | 25 | 100 |
| SPP | 0 | 0.03 | 0.03 | 0.03 | 0.03 | 0 |
| Properties: | | | | | | |
| MI @ 295° C. | — | 1.56 | 1.6 | 1.12 | 0.69 | 0.6 |
| HDT @ 264 psi | 198 | 158 | 164 | 172 | 182 | 161 |
| Notched Izod, ft-lb/in | 0.8 | 2.1 | 2.7 | 0.84 | 0.96 | 9.8 |
| reversed Notched Izod, ft-lb/in | 20.0 | 34.6 | 40.2 | 31.7 | 23.5 | 39 |
| Dynatup, ft-lb | 6.3 | 19.6 | 30.8 | 43.2 | 2.5 | 38.4 |
| Tensile strength, Kpsi | 15.2 | 10.7 | 11.3 | 12.8 | 14.5 | 9.3 |
| Tensile elongation, % | 60 | 44 | 19 | 46 | 14 | 33 |
| Tensile modulus, Kpsi | 430 | 344 | 373 | 422 | 465 | 333 |
| Flexural strength, Kpsi | 22.0 | 15.9 | 16.5 | 18.2 | 20.4 | 13.4 |
| Flexural modulus, Kpsi | 480 | 377 | 391 | 422 | 467 | 325 |
| Specific gravity | 1.27 | 1.21 | 1.22 | 1.24 | 1.26 | 1.20 |
| Transparent | yes | yes | yes | yes | yes | yes |
| Yellowness index | 73 | 87.7 | 97.1 | 111.5 | 126.1 | 24.8 |

The compositions and data in Table 2 illustrate that a wide range of transparent PEI/PEC blends can be made when an effective amount of a catalyst is added to the compositions. Surprisingly over the wide range of illustrated compositions very good physical properties were generally obtained with the desired transparency. It was expected that the properties would have decreased to a value too low to be useful. However many of the properties exceed the value for one or the other homo-resins.

TABLE 3

| sample: | 12 | 13 | 14 | 15 | 16 | 17 |
|---|---|---|---|---|---|---|
| PEI-1 | 0 | 25 | 25 | 0 | 0 | 25 |
| PEI-2 | 0 | 0 | 0 | 0 | 25 | 0 |
| PEI-3 | 0 | 0 | 0 | 25 | 0 | 0 |
| PEC-1 | 99.98 | 74.98 | 0 | 74.98 | 74.98 | 0 |
| PEC-2 | 0 | 0 | 74.98 | 0 | 0 | 0 |
| PC-1 | 0 | 0 | 0 | 0 | 0 | 74.98 |
| SPP | 0.02 | 0.02 | 0.02 | 0.02 | 0.02 | 0.02 |
| Properties: | | | | | | |
| MI @ 295° C. | 1.36 | 1.13 | 0.89 | 1.06 | 1.11 | — |
| HDT @ 264 psi | 153 | 166 | 167 | 164 | 166 | 147 |
| Notched Izod, ft-lb/in | 4.5 | 2.3 | 2.7 | 5.6 | 2.5 | 1.6 |
| reversed Notched Izod, ft-lb/in | 36.3 | 39.9 | 37.2 | 39.3 | 39.4 | 39.9 |
| Dynatup, ft-lb | 28.1 | 41 | 39.8 | 41.2 | 44.2 | 50.4 |
| Tensile strength, Kpsi | 9.6 | 10.6 | 10.9 | 10.3 | 10.9 | 10.1 |
| Tensile elongation, % | 47 | 39 | 39 | 53 | 80 | 105 |
| Tensile modulus, Kpsi | 297 | 295 | 307 | 308 | 330 | 329 |
| Flexural strength, Kpsi | 14.6 | 16.0 | 15.4 | 14.9 | 16.2 | 15.4 |
| Flexural modulus, Kpsi | 348 | 378 | 364 | 357 | 383 | 376 |
| Specific gravity | 1.21 | 1.22 | 1.22 | 1.22 | 1.22 | 1.22 |
| Transparent | yes | yes | yes | no | yes | no |

The data in Table 3 compare three varieties of PEI with 2 different molecular weights of PEC and also present a blend made with a homopolycarbonate (PC-1). PEI-1 and PEI-2 are the same chemically and differ in viscosity and molecular weight with PEI-1 being the lower viscosity and molecular weight resin. PEI 3 is a PEI derived from paraphenylene diamine. PEC-1 and PEC-2 are the same chemically and differ in molecular weight with PEC-1 being the higher weight resin. As seen by these data, the blends containing either the PEI derived from paraphenylene diamine (PEI-3) or the homopolycarbonate (PC-1) were not transparent in the formulation containing a 3:1 ratio of PEC or PC to PEI.

TABLE 4

| sample: | 18 | 19 | 20 | 21 | 22 | 23 |
|---|---|---|---|---|---|---|
| PEI-1 | 25 | 25 | 25 | 25 | 25 | 25 |
| PEC-1 | 74.98 | 74.98 | 74.98 | 74.98 | 74.98 | 74.98 |
| SPP | 0.02 | 0.02 | 0.02 | 0.02 | 0.02 | 0.02 |
| U-626 | 0 | 0.1 | 0 | 0 | 0 | 0 |
| I-168 | 0 | 0 | 0.1 | 0 | 0 | 0 |
| TNPP | 0 | 0 | 0 | 0.1 | 0 | 0 |
| DPP | 0 | 0 | 0 | 6 | 0.1 | 0.3 |
| Properties: | | | | | | |
| MI @ 295° C. | 1.32 | 1.16 | 1.46 | 2.25 | 1.19 | 2.3 |
| HDT @ 264 psi | 166 | 161 | 161 | 158 | 161 | 162 |
| Notched Izod, ft-lb/in | 2.4 | 2.2 | 2.0 | 2.1 | 2.4 | 1.0 |
| reversed Notched Izod, ft-lb/in | 39.6 | 39.7 | 39.6 | 33.2 | 4.02 | 37.7 |
| Dynatup, ft-lb | 51.3 | 27.1 | 35.8 | 22.3 | 42.2 | 28.9 |
| Tensile strength, Kpsi | 11.1 | 11.0 | 11.1 | 11.0 | 11.0 | 11.0 |
| Tensile elongation, % | 31 | 41 | 64 | 57 | 66 | 45 |
| Tensile modulus, Kpsi | 328 | 282 | 291 | 296 | 304 | 321 |
| Flexural strength, Kpsi | 16.4 | 16.2 | 16.1 | 16.2 | 16.3 | 16.5 |
| Flexural modulus, Kpsi | 372 | 370 | 368 | 372 | 372 | 376 |
| Specific gravity | 1.22 | 1.22 | 1.22 | 1.22 | 1.22 | 1.22 |
| Yellowness Index | 92.4 | 65.4 | 69.4 | 74.8 | 65.5 | 63.3 |
| % Transmission | 57 | 67 | 65 | 63 | 68 | 70 |

The blends in Table 4 illustrate the marked reduction in the yellowness index unexpectedly obtained with the addition of a phosphite to the compositions comprising PEI, PEC, and a catalyst. As seen from these data with the addition of an effective amount of a phosphite, the Yellowness Index is improved by at least 19% (calculated from sample 18 versus sample 21 as (92.4–74.8)/92.4×100). From these data, diphenylphosphite (DPP) demonstrated the best overall balance of properties.

TABLE 5

| Sample: | 24 | 25 | 26 | 27 |
|---|---|---|---|---|
| PEI-1 | 25 | 25 | 25 | 25 |
| PC-1 | 74.98 | 74.97 | 74.95 | 0 |
| SPP | 0.02 | 0.03 | 0.05 | 0.02 |
| PEC-1 | 0 | 0 | 0 | 74.98 |
| Transparent | no | no | no | yes |

The blends illustrated in Table 5 comprise a 3:1 ratio of polycarbonate or PEC to a PEI. As seen by these data at a 3:1 ratio, the polycarbonate blend is not transparent and unexpectedly, the PEC blend is transparent. Increasing the catalyst level by 250% (sample 26) did not result in significantly increasing the transparency of a 3:1 ratio of PC to PEI.

TABLE 6

| Sample: | 28 | 29 | 30 | 31 | 32 | 33 | 34 |
|---|---|---|---|---|---|---|---|
| PEI-1 | 50 | 50 | 50 | 50 | 50 | 50 | 50 |
| PEC-1 | 0 | 0 | 0 | 0 | 0 | 0 | s0 |
| PEC-2 | 50 | 50 | 50 | 50 | 50 | 50 | 0 |
| SPP | 0.02 | 0.04 | 0 | 0 | 0 | 0 | 0 |
| SPP - 0.125 wt. % concentrate in PEI-1 | 0 | 0 | 0.005 | 0.02 | 0 | 0 | 0 |
| SPP - 0.250 wt. % concentrate in PEI-1 | 0 | 0 | 0 | 0 | 0 | 0.04 | 0 |
| SPP - 0.5 wt % concentrate in PEI-1 | 0 | 0 | 0 | 0 | 0.01 | 0 | 0 |
| SPP - 2.5 wt % concentrate in PEI-1 | 0 | 0 | 0 | 0 | 0 | 0 | 0.025 |
| Properties: | | | | | | | |
| Notched Izod, ft-lb/in | 0.32 | 0.26 | 0.8 | 0.24 | 1.0 | 0.25 | 1.4 |
| Tensile strength, Kpsi | 9.7 | 5.4 | 10.9 | 6.0 | 10.6 | 3.65 | — |
| Tensile elongation, % | 3.1 | 1.3 | 3.9 | 1.7 | 4.1 | 1.0 | — |
| Melt index at 295° C. | 1.56 | 1.96 | — | 1.94 | — | 2.54 | 1.21 |
| Transparent | yes | yes | no | yes | hazy | yes | yes |

The illustrative examples in Table 6 demonstrate that concentrates are useful in the preparation of transparent compositions. It should be noted that sample 32 was slightly hazy which is thought to be indicative of insufficient reaction between the resin components and the catalyst. It is believed that processing changes can be developed to increase the degree of reaction and produce transparent blends even with this low level of catalyst in concentrate form. Such changes would include increasing the melt temperature and/or the residence time prior to the addition of the catalyst quencher.

TABLE 7

| | 35 | 36 | 37 |
|---|---|---|---|
| Sample: | | | |
| PEI-1 | 50 | 50 | 50 |

TABLE 7-continued

| | 35 | 36 | 37 |
|---|---|---|---|
| PAR | 50 | 50 | 50 |
| SPP | 0 | 0.02 | 0.04 |
| Properties: | | | |
| Notched Izod, ft-lb/in | 0.17 | 0.24 | 0.25 |
| Tensile strength, Kpsi | 8.0 | 5.9 | 4.1 |
| Tensile elongation, % | 6.6 | 1.8 | 1.1 |
| Melt index at 295° C. | — | 0.90 | 1.44 |
| Transparent | no | yes | yes |

The illustrative examples in Table 7 demonstrate that transparent blends may also be made using polyarylate resins while retaining acceptable physical properties.

TABLE 8

| | 38 | 39 | 40 |
|---|---|---|---|
| Sample: | | | |
| PEI-1 | 50 | 50 | 50 |
| PEC-3 | 50 | 50 | 50 |
| SPP | 0 | 0.02 | 0.04 |
| Properties: | | | |
| Notched Izod, ft-lb/in | 0.41 | 0.28 | 0.19 |
| reverse Notched Izod, ft-lb/in | NB | 10.2 | 9.9 |
| Tensile strength, Kpsi | 12.7 | 9.4 | 6.5 |
| Tensile elongation, % | 39 | 7.9 | 5.1 |
| Transparent | no | yes | yes |

NB means "no break" and indicated >16 ft-lb/in

The illustrative examples in Table 8 demonstrate that transparent blends with acceptable physical properties may also be obtained using PEC resin with a high ester content Example 41

A blend was prepared from 50 parts PEC-2, 50 parts PEI-1, and 0.27 parts of bis-phenolate salt hexaethylguanidinium bis(bisphenol-A). Molded test parts were transparent. The control blend without a catalyst was opaque. This blend demonstrated that a thermally degradable catalyst may also be used to produce transparent blends.

What is claimed:

1. A resin composition comprising:

(a) a polyetherimide resin;

(b) at least one resin selected from the group consisting of polycarbonate resins, poly(ester-carbonate) resins, and polyarylate resins, provided that the amount of polycarbonate resin is less than or equal to 50 percent by weight, based on the total weight of the composition; and (c) an effective amount of a catalyst to provide transparency to the composition, wherein said catalyst is sodium phenylphosphinate.

2. The resin composition of claim 1, wherein the polyetherimide resin comprises repeat units of the formula (I):

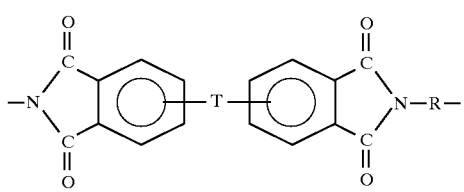

wherein T is —O— or a group of the formula —O—Z—O— wherein the divalent bonds of the —O— or the —O—Z—O— group are in the 3,3'; 3,4'; 4,3'; or the 4,4' positions; Z is a divalent radical selected from the group consisting of formulae (II):

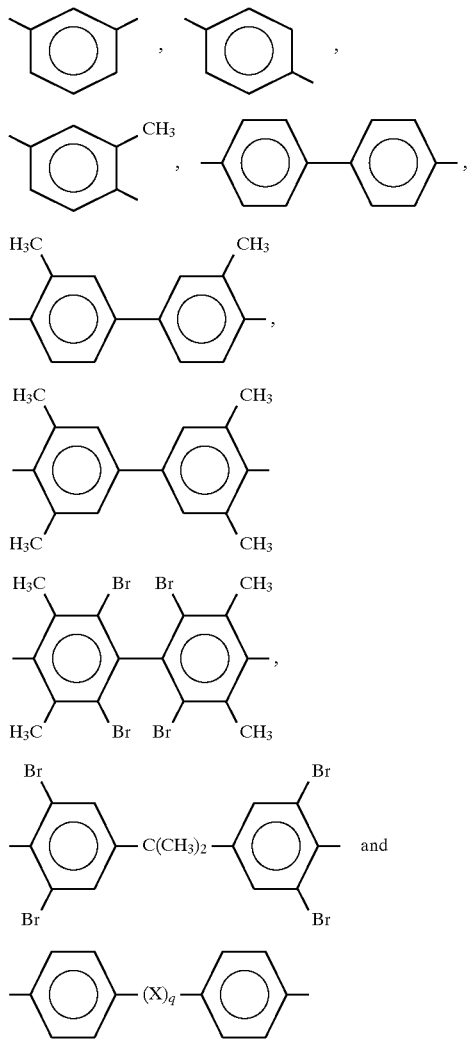

wherein X is a member selected from the group consisting of divalent radicals of the formulae (III):

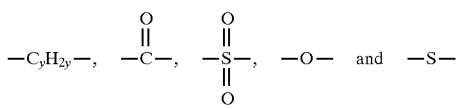

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the formula (IV):

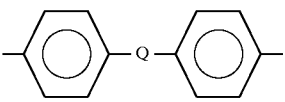

where Q is a member selected from the group consisting of formulae (V):

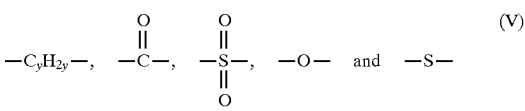

where y is an integer from about 1 to about 5.

3. The resin composition of claim 2, wherein the polyetherimide resin comprises repeating chain units of the formula (VI):

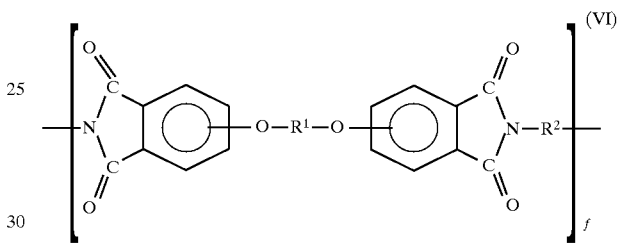

wherein f is an integer of from about 10 to about 500; $R^2$ is para-phenylene, meta-phenylene, or mixtures of para-phenylene and meta-phenylene and $R^1$ is the divalent moiety of formula (VII):

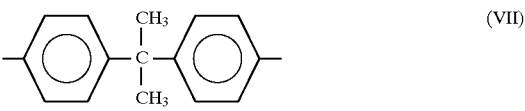

4. The resin composition of claim 1, wherein the poly(ester-carbonate) resin comprises repeating polycarbonate chain units of the formula (VIII):

wherein D is a divalent aromatic radical of a dihydric phenol employed in the resin preparation; and recurring carboxylic chain units of the formula (IX):

wherein D is a divalent aromatic radical of a dihydric phenol employed in the resin preparation and R is a divalent moiety selected from those of the formulae (X) or (XI), or mixtures thereof:

or

-continued

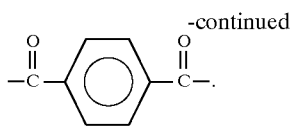
(XI)

5. The resin composition of claim 1, wherein the polyarylate resin has recurring carboxylic chain units of the formula (XII):

(XII)

wherein D is a divalent aromatic radical of a dihydric phenol employed in the resin preparation and R is a divalent moiety selected from those of the formulae (XIII) or (XIV), or mixtures thereof:

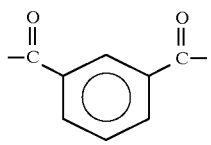
(XIII)

or

(XIV)

6. An article of manufacture made from the composition of claim 1.

7. The composition of claim 1, wherein the catalyst is added to components (a) and (b) as a third component.

8. The resin composition of claim 6, wherein the catalyst is in the form of a concentrate.

9. The resin composition of claim 1, further comprising an effective amount of a catalyst quenching agent.

10. The resin composition of claim 9, wherein the catalyst quenching agent is at least one organic phosphite.

11. The resin composition of claim 9, wherein the catalyst quenching agent is in the form of a concentrate.

12. The resin composition of claim 1, wherein the catalyst is present in an amount of from about 0.0005 weight percent to about 1 weight percent, based on the total weight of the composition.

13. The resin composition of claim 1, wherein the catalyst is present in an amount of from about 0.005 weight percent to about 0.1 weight percent, based on the total weight of the composition.

14. The resin composition of claim 1, wherein the catalyst is present in an amount of from about 0.01 weight percent and about 0.05 weight percent; based on the total weight of the composition.

15. The resin composition of claim 1, wherein component (b) of the composition is a polycarbonate resin, poly(ester-carbonate) resin or a mixture thereof.

16. A resin composition consisting essentially of:
  (a) a polyetherimide;
  (b) at least one resin selected from the group consisting of polycarbonate resins, poly(ester-carbonate) resins, and polyarylate resins, provided that the amount of polycarbonate resin is less than or equal to 50 percent by weight, based on the total weight of the composition;
  (c) an effective amount of a catalyst to provide transparency to the composition, wherein said catalyst is sodium phenylphosphinate.

17. The resin composition of claim 16, further consisting essentially of a catalyst quenching agent.

18. The resin composition of claim 16, wherein component (b) of the composition is a polycarbonate resin, poly(ester-carbonate) resin or a mixture thereof.

19. The composition of claim 18, wherein, absent addition of component (c), the combination of components (a) and (b) does not exhibit transparency.

20. A resin composition comprising at least one reaction product of
  (a) a polyetherimide and
  (b) at least one resin selected from the group consisting of polycarbonate resins, poly(ester-carbonate) resins, and polyarylate resins, provided that the amount of polycarbonate resin is less than or equal to 50 percent by weight, based on the total weight of the composition and further comprising
  (c) an effective amount of a catalyst to provide transparency to the composition, wherein said catalyst is sodium phenylphosphinate.

21. The resin composition of claim 20, wherein the reaction product is made by catalyzing the reaction of a mixture comprising:
  (a) a polyetherimide resin and
  (b) at least one resin selected from the group consisting of polycarbonate resins, poly(ester-carbonate) resins, and polyarylate resins with a catalyst.

22. The resin composition of claim 21, wherein the composition further comprises a catalyst quenching agent.

23. The resin composition of claim 22, wherein at least one of the catalyst and the catalyst quenching agent is in the form of a concentrate.

24. The resin composition of claim 20, wherein component (b) of the composition is a polycarbonate resin, poly(ester-carbonate) resin or a mixture thereof.

* * * * *